United States Patent [19]

Yamana et al.

[11] Patent Number: 4,758,482

[45] Date of Patent: Jul. 19, 1988

[54] ENCLOSED TYPE LEAD BATTERIES AND METHOD FOR PRODUCING THE SAME

[75] Inventors: Takumi Yamana, Nara; Tomoyuki Ohkura, Osaka; Akira Ishiodori; Yoshimi Yabui, both of Mie; Yutaka Suzuki, Mie; Masayoshi Aoki, Saitama; Mikio Oguma, Saitama; Masatoshi Takasu, Mie; Akio Komaki, Mie; Takumi Hayakawa, Mie; Kensuke Hironaka, Mie; Hironao Wada, Mie; Satoshi Matsubayashi, Mie, all of Japan

[73] Assignee: Shin-Kobe Electric Machinery Co., Ltd., Tokyo, Japan

[21] Appl. No.: 101,266

[22] Filed: Sep. 25, 1987

[30] Foreign Application Priority Data

Dec. 19, 1986 [JP] Japan ............................... 61-303495
Feb. 19, 1987 [JP] Japan ............................... 62-36698
Feb. 19, 1987 [JP] Japan ............................... 62-36699
Feb. 25, 1987 [JP] Japan ............................ 62-26673[U]

[51] Int. Cl.$^4$ ............................................. H01M 2/02
[52] U.S. Cl. ......................................... 429/53; 429/163; 429/176; 429/225
[58] Field of Search ..................... 429/53, 82, 72, 136, 429/138, 139, 153, 163, 175, 176, 225–228

[56] References Cited

U.S. PATENT DOCUMENTS

| 2,490,630 | 12/1949 | Jardine | 429/138 |
| 2,870,235 | 1/1959 | Soltis | 429/139 X |
| 3,375,136 | 3/1968 | Biggar | 429/127 |
| 3,457,112 | 7/1969 | Reber | 429/225 X |
| 3,738,860 | 6/1973 | Von Roda et al. | 429/163 X |
| 4,525,926 | 7/1985 | Pearson | 429/225 X |
| 4,664,994 | 5/1987 | Koike et al. | 429/163 |

Primary Examiner—Anthony Skapars
Attorney, Agent, or Firm—Wegner & Bretschneider

[57] ABSTRACT

An enclosed type lead battery comprises in combination:

a cap formed of a synthetic resin, which is integrally formed with anodec and cathodec terminals formed of lead or a lead alloy inserted therein and an exhaust portion to which a safety valve is attached, a plate stack having its ears connected to said terminals, and an enclosure formed of a film or sheet made of a synthetic resin, in which said plate stack is placed, and which is thermally fused at the peripheral edge of its opening to said cap.

13 Claims, 3 Drawing Sheets

4,758,482

ENCLOSED TYPE LEAD BATTERIES AND METHOD FOR PRODUCING THE SAME

BACKGROUND OF THE INVENTION

1. Field of the Invention

The present invention relates to an enclosed type lead battery used for the power source of portable equipment and, more particularly, to improvements in or relating to the jar or container thereof.

2. Statement of the Prior Art

The conventional enclosed type lead batteries so far produced include a synthetic resin-made jar having therein a stack consisting of positive plates, negative plates and a separator.

In recent years, there has been a growing demand for reducing the weight, size and thickness of the enclosed type lead batteries, as equipment using such batteries has increasingly been miniaturized. To meet such a demand, the structure that the stack of plates is wrapped in a film or sheet made of a synthetic resin has been proposed in the art. According to this proposal, the stack of plates is put between two films or sheets, the peripheral edges of which are then fused together to wrap it. The terminals are drawn out of the fused portion, while keeping airtightness at the same time. However, the terminal-confined portion should be subjected to special treatment and technique to make airtightness complete, and there are much uncertainties with regard to reliability due to the terminal portion being lacking in rigidity.

SUMMARY OF THE INVENTION

An object of the present invention is to provide an enclosed type lead battery of the thin structure, which includes a rigid terminal portion and an bag-form container or enclosure formed of a film or sheet.

According to the enclosed type lead battery according to the present invention, the aforesaid problems are solved or eliminated by using as the battery enclosure a bag-form enclosure formed of a synthetic resin film or sheet in place of boxlike enclosure formed of a synthetic resin by injection molding. More specifically, the present invention provides an enclosed type lead battery of the structure which comprises in combination:

a cap made of a synthetic resin which is integrally formed with anodic and cathodic terminal made of lead or a lead alloy inserted therein and an exhaust portion to which a safety valve is attached, a plate stack having its terminal lugs connected to terminals of said cap, and an bag-form enclosure in which said plate stack is placed, and which has an opening, the peripheral edge of which is fused to said cap.

In the production of the enclosed type lead battery according to the present invention, the film or sheet is formed into a bag-form enclosure by thermal fusing, and the peripheral edge of an opening in said enclosure is thermally fused to the cap for the sealing purpose, thereby assuring airtightness therebeween.

BRIEF DESCRIPTION OF THE DRAWINGS

The present invention will now be explained in detail with reference to the accompanying drawings which are given for the purpose of illustration alone, and in which:

FIGS. 6 show the structure of a safety valve of a still further embodiment of the enclosed type lead battery, wherein

PREFERRED EMBODIMENTS OF THE INVENTION

Figure 1:
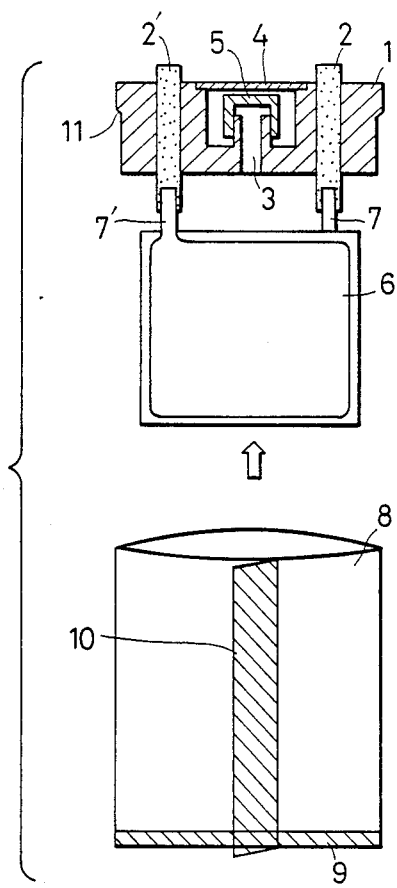
FIG. 1 is a view showing the construction of one embodiment of the enclosed type lead battery according to the present invention.

Referring to FIG. 1 that is a view illustrating the construction of one embodiment of the enclosed type lead battery according to the present invention, anode and cathode terminals 2 and 2' made of lead or a lead alloys are inserted and molded in a synthetic resin member simultaneously with formation of a cylindrical exhaust portion 3, thereby forming a cap 1 made of a synthetic resin. Welded to the terminals 2 and 2' extending downwardly of the cap 1 are terminal lugs 7 and 7' of a plate stack 6. A laminated film or sheet of a synthetic resin is formed into a bag-form enclosure, and its base and margin are thermally fused together at 9 to form an envelope member 8 for accommodating the plate stack 6. For the same purpose, two films or sheets may be put one upon another, and then thermally fused together at three sides.

The plate stack 6 is placed in the enclosure or envelope member 8, which is then inserted over the cap 1 until its opening reaches a stepped portion 11 of the cap 1, and is positioned there. Afterwards, the envelope member 8 is fused around the cap 1 by means of ultrasonic waves for complete sealing. Therefore, the face of the envelope member 8 to be fused is desirously formed of the same material as that of the molded cap 1. Suitable to this end are polypropylene and high-density polyethylene.

The cylindrical exhaust portion 3 of the cap 1 is provided with a safety valve 5 made of rubber, which is designed to be opened to release pressure, when the internal pressure of the battery rises. A lid member 4 for pressing down and holding the safety valve 5 is attached to the cap 1 in such a manner that it covers a recess in which the safety valve 5 is placed.

As the film or sheet forming the envelope member 8, use should preferably be made of a laminated film or sheet, the inner layer of which includes at least one polyvinylidene chloride layer to prevent the battery's performance from deteriorating due to the transmission of water from within the battery and the invasion of oxygen from the outside. The polyvinylene layer may be about 2-30 μm in thickness varying depending upon the purpose. It is also preferred that polypropylene, particularly polyethylene terephthalate excelling in strength at high temperatures is used for the outermost layer of the laminated film or sheet. Further, when it is intended to improve the impact resistance of the laminated film or sheet depending upon the purpose, satisfactory results are obtained, if a metal such as aluminium or SUS 316 or an alloy having a thickness of about 10-1000 μm is used for at least one of the layers except for the layer to be directly fused to the cap.

In the following, another and further embodiments of the present invention will be explained.

Figure 2:
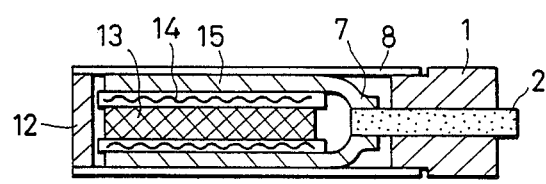
FIG. 2 is a longitudinally sectioned view showing another embodiment of the enclosed type lead battery, FIGS. 3(a), (b) and (c) are sectional views showing pole-confined portions of a further embodiment of the enclosed type lead battery, FIGS. 4(a) and (b) are front and side views showing the cap of a still further embodiment of the enclosed type lead battery.

Referring to FIG. 2 that is a view showing another embodiment of the enclosed type lead battery, which is sectioned in the longitudinal direction of a plate stack, an enclosure or envelope member is provided with a bottom lid 12 formed of the same material as that of the synthetic resin-made cap 1. This assures that the plate stack is positioned in place. After the ear 7 of the plate stack is connected to a terminal 2, a laminated film or sheet is inserted thereover in the flattened cylindrical form, or the plate stack is wrapped in a laminated film or sheet which is then thermally fused together on the sides into a flattened cylindrical form, thereby forming the envelope member 8. The envelope member 8 includes the bottom lid 12, and is thermally fused to the cap 1 and the bottom lid 12. It is to be noted that, in FIG. 2, reference numeral 13, 14 and 15 stand for positive plates, a separator impregnated with an electrolyte to such an extent that no free electrolyte is present and negative plates, respectively, which define together the plate stack.

Figures 3A, 3B, 3C:
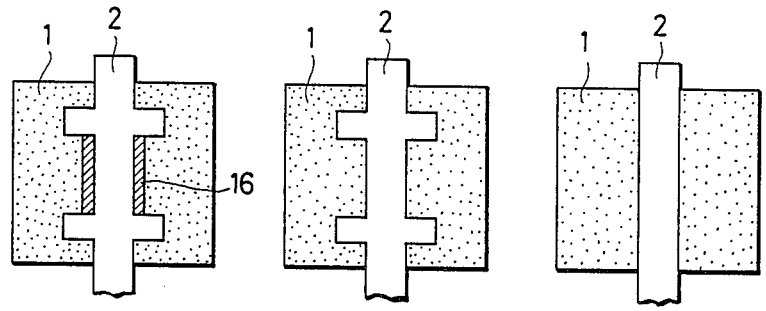

Referring to FIG. 3(a) that is a section showing a pole-confined portion of a further embodiment of the enclosed type lead battery, a polar portion of the terminal 2 covered with the resin forming the cap 1 is provided with collars at two locations. When the poles of the anode and cathode terminals are only in the columnar form, the adhesion of the poles to the resin at their interface is not appreciably strong so that leakage of the electrolyte may take place, even though they are insert-molded. Provision of such collars leads to an increase in the adhesion. In FIG. 3, reference numeral 16 stands for a thermosetting resin applied between the collars, which further improves the adhesion.

Prepared were 100 battery samples for each of the three types shown in FIGS. 3(a)-(c), which were then subjected to heat cycle testings of 80° C.×12 h+(−20° C.)×12 h. As a result, it was found that, at the 50th cycle, only 3 and 18 samples failed of the FIGS. 3(a) and 3(b) samples, but as many as 87 did of the FIG. 3(c) samples.

Figures 4A, 4B:
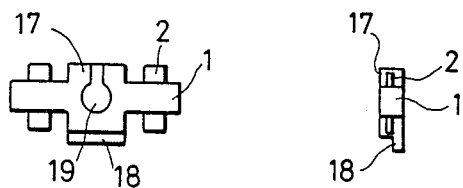

FIGS. 4(a) and (b) are front and side views showing the cap of a still further embodiment of the enclosed type lead battery. A cap 1 made of a synthetic resin is provided on its upper and lower portions with protuberances higher than the projecting height of terminals 2, which are formed by rising of the resin around the terminals 2. Even when the battery contacts the face of an electrically conductive member for some reasons, both terminals are prevented from simultaneously contacting the face of an electrically conductive member and short-circuiting due to the provision of the upper protuberance 17. Also, even when the positive plates extend due to charging or discharging of the battery, their upper faces are prevented from contacting the cathodic pole due to the presence of the lower protuberance 18. It is to be noted that reference numeral 10 denotes a safety valve portion provided on the cap 1.

Figure 5:
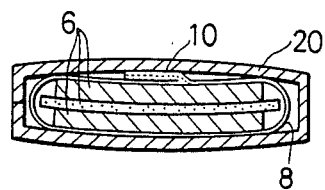
FIG. 5 is a sectional view of a still further embodiment of the enclosed type lead battery, in which the battery is placed in a case 20.

Referring to FIG. 5 that is a sectional view showing a still further embodiment of the enclosed type lead battery, an enclosed type lead battery is placed in a case 20. In some cases, the enclosed type lead battery may be placed in a rigid case formed of a metal plate so as to apply pressure to a plate stack. Since the thickness of the case is insufficient, however, the case is swollen out at its middle so that a pressure to be applied to the middle of the plate stack becomes insufficient. In this embodiment, a margin 10 of an envelope member 8 to be fused is substantially located at the middle of a plate stack 6, and is bent in the vicinity of the middle of the plate stack. This envelope member 8 is placed in the case, whereby the thickness of the margin 10 bent and superposed upon the plate stack can be used as the pressurizing force to make up for a deficiency in the pressure to be applied to the middle of the plate stack.

Figure 6A:
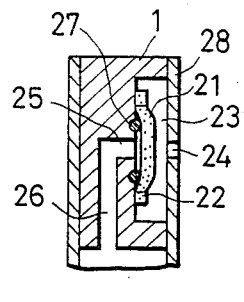
FIG. 6(a) is a side view thereof.
Figure 6B:
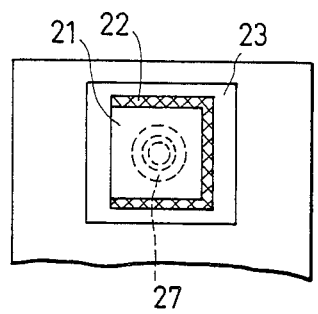
FIG. 6(b) is a front view thereof in which an outer plate is removed.

Referring to FIG. 6, there is shown the structure of a safety valve of a still further embodiment of the enclosed type lead battery. FIG. 6(a) is a sectional view of the safety valve, and FIG. 6(b) is a front view of the safety valve from which an outer plate is removed. This safety valve is designed to have a small volume so as to reduce the size and thickness of a battery. A film or sheet 21 is fused to a portion 22 of a cap around an exhaust hole 25 by means of ultrasonic waves or heat sealing, while remaining partly unfused, thereby forming the safety valve. If the internal pressure of the battery rises, the gas then flows from within the battery to an exhaust chamber by way of an exhaust passage 26 through a gap defined between an outlet of the exhaust hole 25 and the film or sheet 21 enlarged by that internal pressure, and is discharged to the outside of the battery through a small hole 24 formed in the outer plate 28. If the internal pressure of the battery drops, the film or sheet 21 is then restored to the original state due to its elasticity to close up the exhaust hole 25. An O-ring may be provided to make the safety valve more efficient as illustrated, in the safety valve of the aforesaid structure, if a viscous liquid is impregnated in between the film or sheet 21 and the exhaust hole 25, that liquid is then retained therebetween by capillarity. If the internal pressure of the battery rises, a gas flows out through gaps defined thereby in the liquid. If the internal pressure of the battery drops, the liquid is restored to the original state by an intermolecular force to keep the battery sealed. In this manner, the safety valve performs its own function.

Figure 7:
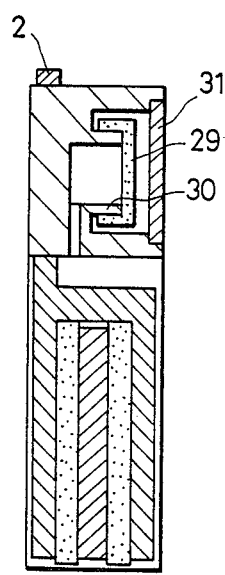
FIG. 7 is a sectional view of a still further embodiment of the enclosed type lead battery, in which a valve cylinder 30 is positioned substantially in parallel with respect to the thickness of a plate stack.

Referring to FIG. 7 that is a sectional view showing a still further embodiment of the enclosed type lead battery, a valve cylinder 30 is located substantially in parallel with respect to the thickness of a plate stack. With such an arrangement, it is not required to reduce the diameters of the valve cylinder 30 and a rubber cap 20 fitted thereover, when the size of a battery is reduced. Nor is any adverse influence exerted upon the production operations and the operation of the safety valve. Reference numeral 31 denotes a lid provided on the outside of the rubber cap 29, and 2 stands for a terminal.

Figure 8:
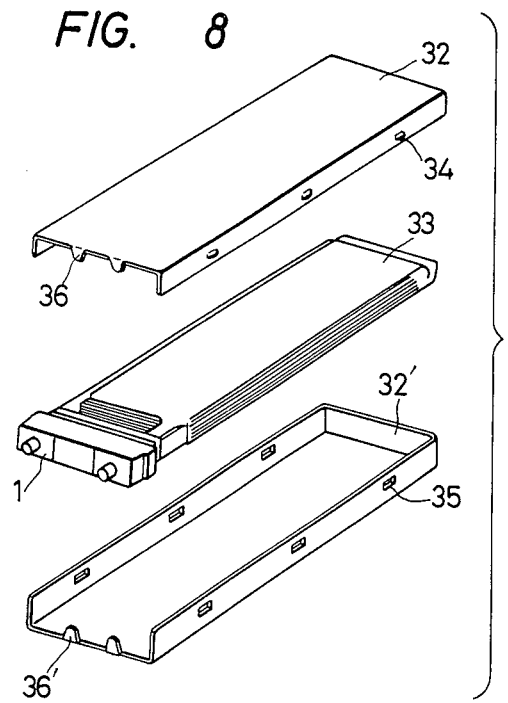
FIG. 8 is a perspective view showing the structure of a still further embodiment of the enclosed type lead battery.

Referring to FIG. 8 that is a perspective view showing the construction of a still further embodiment of the enclosed type lead battery, a plate stack 33 wrapped in a film or sheet is put in between a pair of metallic case wrapped in a film or sheet is put in between a pair of metallic case halves 32 and 32', and is pressurized from above and below. One half 32 is provided with pawls 34 on its side, while the other half 32' is provided with holes 35 on its side, in which the pawls 32 are only pushed and engaged to form a case. Thus, when a metallic case is used for holding under pressure the plate stack 33, the workability is considerably improved. It is to be understood that projections 36 and 36' are engaged with the upper face of a cap 1 to prevent disengagement of the plate stack 33 from the case.

With no need of any mold for forming battery cases or jars, the present invention is immediately accommodative to changes in the volume and size of batteries to be produced. According to the present invention, since it is possible to insert and firmly fix the terminal portion into the rigid cap, the reliablity of the sealing opening of a termina-drawing portion is improved. The material of the laiminated film forming the envelope member can be selected such that it prevents the battery's performance from deteriorating. Since the film per se has a high strength, and shows satisfactory thermal fusibility with respect to the cap, it is easy to manufacture batteries. The overall thickness of the battery can be reduced by making thin the safety valve to be mounted on the cap. The enclosed type lead battery can easily be placed in a case. According to the present invention, it is thus possible to manufacture high-performance enclosed type lead batteries, the weight, size and thickness of which are all reduced.

What is claimed is:

1. An enclosed type lead battery comprising in combination:
   a cap formed of a synthetic resin, which is integrally formed with anodic and cathodic terminals formed of lead or a lead alloy inserted therein and an exhaust portion to which a safety valve is attached,
   a plate stack having its terminal lugs connected to said terminals, and
   an bag-form enclosure formed of a film or sheet made of a synthetic resin, in which said plate stack is placed, and which is fused at the perihperal edge of its opening to said cap.

2. A battery as defined in claim 1, in which said enclosure is formed of a laminated film or sheet comprising an innermost layer made of a synthetic resin analogous to that of said cap, an outermost layer made of polyethylene terephthalate, and at least one intermediate layer made of polyvinylidene chloride.

3. A battery as defined in claim 1, in which said enclosure is formed of a laminated film or sheet having at least one layer including a metal or an alloy, except for the layer directly fused to said cap.

4. A battery as defined in claim 1, in which said enclosure is formed of a laminated film or sheet in the flattened cylindrical form, and includes a bottom lid formed of the same material as that of said cap formed of a synthetic resin.

5. A battery as defined in claim 1, in which, at pole-confining portions defined by injection molding of the resin of said cap around poles of said anodic and cathodic terminals, polar portions covered with said resin are provided with collars at two or more locations.

6. A battery as defined in claim 5, in which a thermosetting resin is applied between said collars of said polar portions.

7. A battery as defined in claim 1, in which, on at least one of the upper and lower portions of said cap, the resin around said terminals is permitted to rise to a height higher than the ends of said terminals.

8. A battery as defined in claim 1, in which the location of the laminated film or sheet forming said enclosure is substantially positioned at the middle of said plate stack and is bent in the vicinity of the middle of said plate stack, and is thereafter placed in rigid case.

9. A battery as defined in claim 1, in which said film or sheet is fused around an exhaust hole in said cap, while remaining partly unfused, thereby defining a safety valve.

10. A battery as defined in claim 1, in which said safety valve comprises a valve cylinder and a rubber cap, and is positioned substantially in parallel with respect to the thickness of said plate stack.

11. A battery as defined in claim 1, in which a pair of metallic case halves having an enclosed plate stack put therebetween are pressurized from above and below, and said case halves being partly superposed one upon another in the vertical direction, and one of said case halves being provided with pawls on its side, while the other being provided with holes on its side, within which said pawls are engaged.

12. An enclosed type lead battery comprising in combination:
   a cap formed of a synthetic resin, which is integrally formed with anodic and cathodic terminals formed of lead or a lead alloy inserted therein and an exhaust portion to which a safety valve is attached,
   a plate stack having its terminal lugs connected to said terminals, and
   an enclosure formed of a film or sheet made of a synthetic resin, in which said plate stack is placed, and which is thermally fused at the peripheral edge of its opening to said cap.

13. A battery as defined in claim 2, in which said enclosure is formed of a laminated film or sheet having at least one layer including a metal or an alloy, except for the layer directly fused to said cap.

* * * * *